US008819629B2

(12) United States Patent
Sherrill

(10) Patent No.: US 8,819,629 B2
(45) Date of Patent: Aug. 26, 2014

(54) AUTOMATICALLY GENERATING DOCUMENTATION ON APPLICATION PROGRAMMING INTERFACES

(75) Inventor: Justin Lee Sherrill, Raleigh, NC (US)

(73) Assignee: Red Hat, Inc., Raleigh, NC (US)

(*) Notice: Subject to any disclaimer, the term of this patent is extended or adjusted under 35 U.S.C. 154(b) by 743 days.

(21) Appl. No.: 12/707,606

(22) Filed: Feb. 17, 2010

(65) Prior Publication Data

US 2011/0202933 A1  Aug. 18, 2011

(51) Int. Cl.
*G06F 9/45* (2006.01)

(52) U.S. Cl.
USPC .......................................... 717/123; 719/328

(58) Field of Classification Search
CPC ....................................................... G06F 8/73
USPC .......................................... 717/123; 719/328
See application file for complete search history.

(56) References Cited

U.S. PATENT DOCUMENTS

| | | | | |
|---|---|---|---|---|
| 4,860,203 | A * | 8/1989 | Corrigan et al. | 717/123 |
| 6,389,481 | B1 * | 5/2002 | Malcolm | 719/310 |
| 6,675,370 | B1 * | 1/2004 | Sundaresan | 717/106 |
| 7,155,664 | B1 * | 12/2006 | Lee et al. | 715/273 |
| 7,188,336 | B2 * | 3/2007 | Humphries | 717/123 |
| 7,222,333 | B1 * | 5/2007 | Mor et al. | 717/115 |
| 7,568,184 | B1 * | 7/2009 | Roth | 717/123 |
| 2003/0037312 | A1 * | 2/2003 | Czech | 717/120 |
| 2003/0145282 | A1 * | 7/2003 | Thomas et al. | 715/513 |
| 2004/0034613 | A1 * | 2/2004 | Purvis et al. | 707/1 |
| 2004/0061719 | A1 * | 4/2004 | Barsness et al. | 345/760 |
| 2005/0060688 | A1 * | 3/2005 | Kamalakantha | 717/123 |
| 2006/0143594 | A1 * | 6/2006 | Grimaldi | 717/123 |
| 2009/0210861 | A1 * | 8/2009 | Alupului | 717/123 |

OTHER PUBLICATIONS

Lichtman, A., "Self Documenting Macros" (Dec. 1, 1972) [retrieved from http://ip.com/pdf/ipcompad/IPCOM000078275D.pdf].*
Sun Microsystems, "Javadoc—The Java API Documentation" (Aug. 16, 2000) [retrieved from http://web.archive.org/web/20000081694650/http://java.sun.com/j2se/1.3/docs/tooldocs/win32/javadoc.html on Apr. 14, 2005].*
Kramer, D., "API Documentation From Source Code Comments: A Case Study of Javadoc," (1999), Proceedings of the 17th Annual International Conference on Computer Documentation (SIGDOC '99). ACM, New York, NY, USA, pp. 147-153 [retrieved from http://doi.acm.org/10.1145/318372.318577].*
Leslie, D., "Using Javadoc and XML to produce API reference documentation," (2002), Proceedings of the 20th Annual International Conference on Computer Documentation (SIGDOC'02). ACM, New York, NY, USA, pp. 104-109. [retrieved from http://doi.acm.org/10.1145/584955.584971].*
Nørmark, K., "Scheme Program Documentation Tools" (Sep. 22, 2004), Proceedings of the Fifth Workshop on Scheme and Functional Programming, Snowbird, Utah, pp. 1-11 [retrieved from http://citeseerx.ist.psu.edu/viewdoc/download?doi=10.1.1.115.85&rep=rep1&type=pdf].*

(Continued)

*Primary Examiner* — Brian W Wathen
(74) *Attorney, Agent, or Firm* — Lowenstein Sandler LLP

(57) ABSTRACT

Some embodiments of a system and a method to automatically generate documentation on application programming interfaces (APIs) have been presented. For instance, while a processor is building a software system from programming code including APIs, the processor may extract objects related to the APIs from comments embedded in the programming code and automatically generate documentation on the APIs using the objects extracted and templates associated with the objects extracted.

24 Claims, 6 Drawing Sheets

(56) References Cited

OTHER PUBLICATIONS

Gropp, W., "Users Manual for Doctext: Producing Documentation from C Source Code" (Mar. 1995) [retrieved from ftp://info.mcs.anl.gov/pub/tech_reports/reports/TM206.pdf].*

Lischner, R., "C++ in a Nutshell," (2003), O'Reilly & Associates, pp. 276-289.*

"Core Java: Javadoc Tool", accessed at: http://java.sun.com/j2se/javadoc/ on Jan. 5, 2010, 2 pages.

"Javadoc", accessed at: http://en.wikipedia.org/wiki/Javadoc on Jan. 5, 2010, last updated Dec. 5, 2009, 4 pages.

* cited by examiner

```
/**
 * Gets a list of all systems visible to user
 *
 * @param sessionKey The sessionKey containing the logged in user
 * @return Returns an array of maps representing all systems visible to user
 *
 * @throws FaultException A FaultException is thrown if a valid user can not be found
 * from the passed in session key
 *
 * @xmlrpc.doc Returns a list of all servers visible to the user.
 * @xmlrpc.param #param("string", "sessionKey")
 * @xmlrpc.returntype
 *      #array()
 *          $SystemOverviewSerializer
 *      #array_end()
 */
public Object[] listSystems(String sessionKey) throws FaultException {
    User loggedInUser = getLoggedInUser(sessionKey);
    DataResult<SystemOverview> dr = SystemManager.systemListShort(loggedInUser, null);
    dr.elaborate();
    return dr.toArray();
}
```

FIG. 2A

```
/**
 * SystemOverviewSerializer
 * @version $Rev$
 *
 * @xmlrpc.doc
 *
 * #struct("system")
 *     #prop("int", "id")
 *     #prop("string", "name")
 *     #prop_desc("dateTime.iso8601", "last_checkin", "Last time server
 *         successfully checked in")
 * #struct_end()
 *
 */
public class SystemOverviewSerializer implements
XmlRpcCustomSerializer {
```

FIG. 2B

```
<ul class="apidoc">
#foreach( $call in $handler.calls )
<li>$call.name</li>
#end
</ul>
```

FIG. 2D

```
#macro( array)        ← 231
array:
    <ul> <li>
#end
#macro(array_end)     ← 232
</li></ul>
#end
```

FIG. 2C

AUTOMATICALLY GENERATING DOCUMENTATION ON APPLICATION PROGRAMMING INTERFACES

TECHNICAL FIELD

Embodiments of the present invention relate to documenting software, and more specifically to automatic generation of documentation on application programming interfaces.

BACKGROUND

Conventionally, application programming interfaces (APIs) are frequently used in software systems to interface different software modules for performing various tasks and/or functions, such as installing packages, building systems, etc. In general, information about the APIs is provided every time an API is called. Specifically, comments are inserted into programming code where an API is called to describe what the API does, arguments to be taken, and output structure of the API. These comments in programming code are generally intended to be read by humans and are ignored by computing machines during compilation of the programming code.

To create documentation on the programming code, conventional scripts and/or tools are used to go through the programming code and extract these comments from the programming code. For instance, a script may simply extract the comments and output the comments extracted as plaintext into a text file, which may be used as the documentation on the programming code.

One problem with the above conventional approach is that the formatting of the documentation is done within the programming code itself. If one wants to change the way it looks, he/she needs to go into the programming code to change the comments inserted in the programming code.

Another problem with the above approach is the lack of consistency. Typically, many people (commonly referred to as programmers) are involved in writing the programming code and the way each programmer writes the comments about the same API may vary. For instance, different vocabularies may be used to describe the function of the same API. In another instance, different programmers may put the same description of an API into different formats. Such inconsistency in documentation may eventually lead to great confusion among users of the APIs.

Another problem with the above approach is the difficulty in updating the documentation. As mentioned above, the APIs are typically called many times in the programming code and comments about the APIs are inserted into the programming code every time the APIs are called. In order to update the documentation of an API, one has to go through the entire programming code to identify all calls of the API and then make the same change in all comments associated with the API in the programming code. This is generally a tedious and error-prone process.

BRIEF DESCRIPTION OF THE DRAWINGS

The present invention is illustrated by way of example, and not by way of limitation, in the figures of the accompanying drawings and in which:

FIG. 2A illustrates one example of an API call, which lists all systems visible to a user.

FIG. 2B illustrates one embodiment of the documentation of an exemplary class.

FIG. 2C illustrates some exemplary macros for rendering in the Hypertext Markup Language (HTML) mode.

FIG. 2D illustrates one exemplary template from one embodiment of an HTML type file.

DETAILED DESCRIPTION

Figure 1:
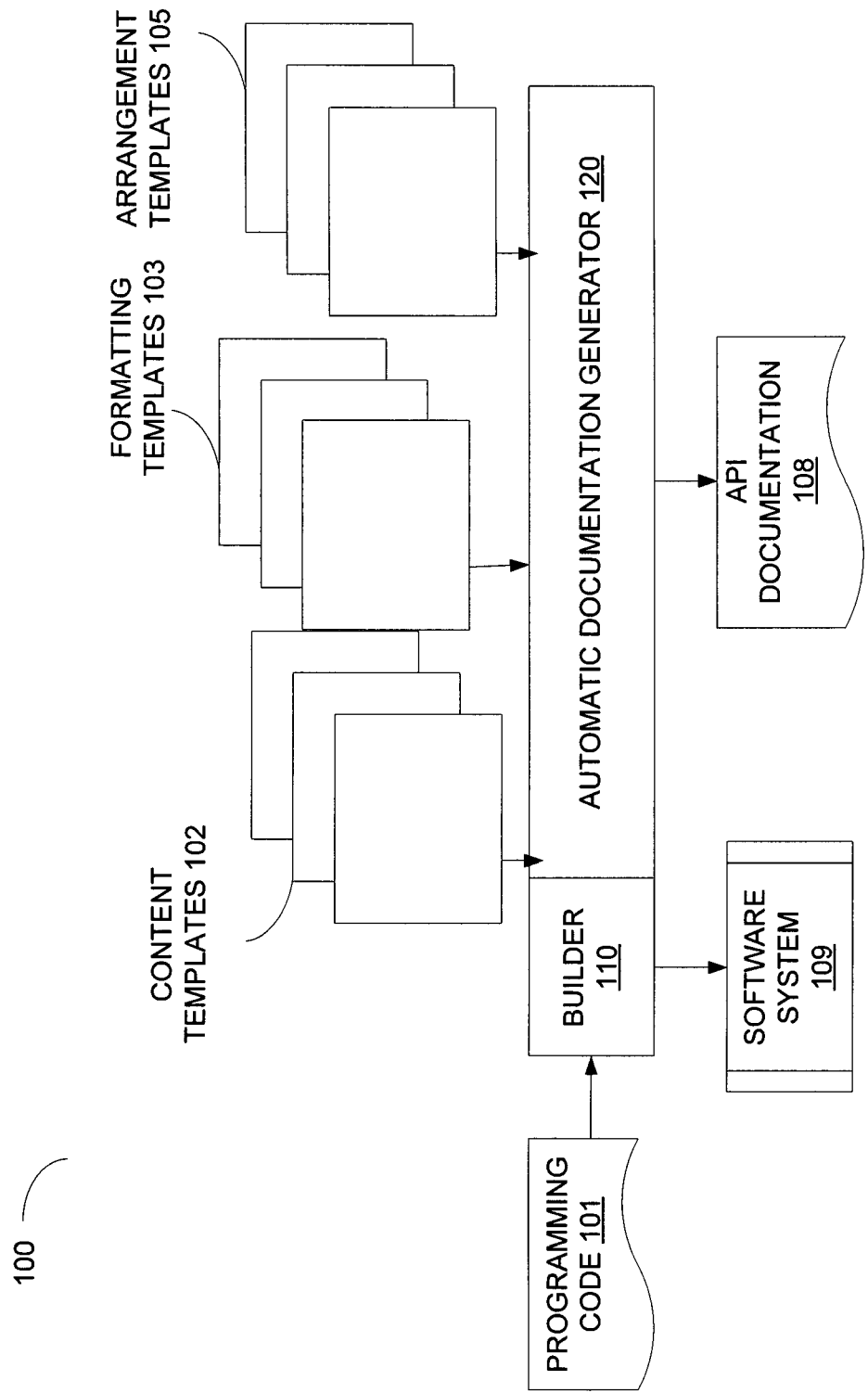
FIG. 1 illustrates one embodiment of a computing system operable to automatically generate documentation on APIs.

Described herein are some embodiments of a method, an apparatus, and a system to automatically generate documentation on application programming interfaces (APIs). In one embodiment, while a processor is building a software system from programming code including APIs, the processor may extract objects related to the APIs from comments embedded in the programming code and automatically generate documentation on the APIs using the objects extracted and templates associated with the objects extracted. Documentation on the APIs as used herein broadly refers to a set of one or more files containing human-readable information on the APIs arranged in a predetermined format. More details of some embodiments of how to automatically generate documentation on APIs are described below.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "building" or "extracting" or "generating" or "executing" or "modifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a machine-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description below. In addition, the present invention is not described with reference to any particular programming language. It will be appreciated that a variety of programming languages may be used to implement the teachings of the invention as described herein.

Figure 4:
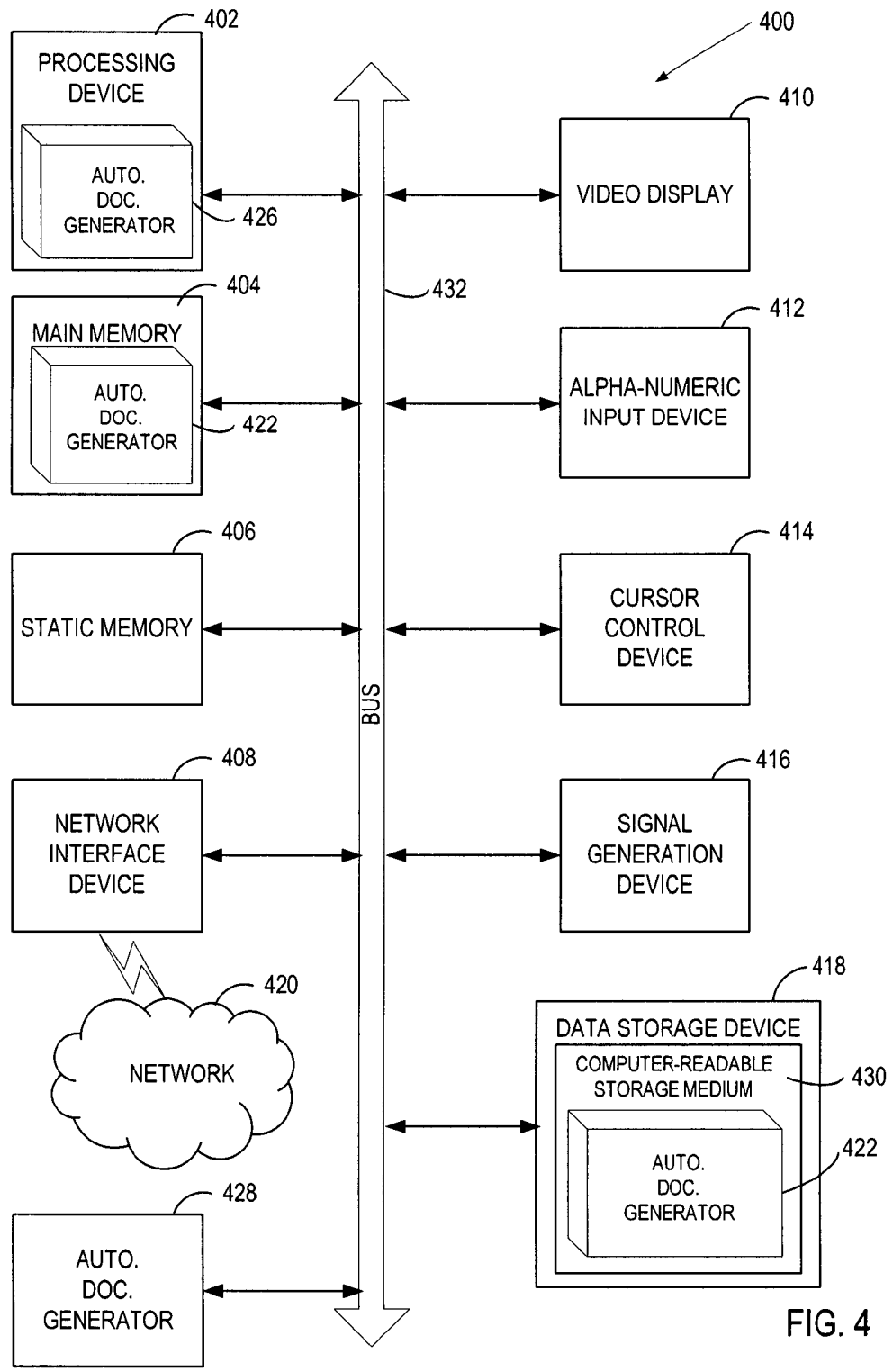
FIG. 4 illustrates a block diagram of an exemplary computing system.

FIG. 1 illustrates one embodiment of a computing system. The computing system 100 includes a builder 110 and an automatic documentation generator 120, each of which may include software, hardware, firmware, or a combination of any of the above. The computing system 100 may be implemented on one or more computing machines, such as a server, a desktop personal computer, a laptop, a personal digital assistant, etc. Details of one example of a computing machine are illustrated in FIG. 4. In general, the builder 110 is operable to convert programming code into a standalone software system that is executable on a computing machine. The programming code is also commonly referred to as source code, which typically includes lines of human-readable instructions and comments. While the instructions are typically compiled into binary code (also referred to as machine-readable instructions) executable by computing machines, the comments are typically not converted because the comments are generally intended to be read by humans. In one example, programming code 101 is input to the builder 110, which builds a software system 109 from the programming code 101.

In addition to the builder 110, the computing system 100 further includes the automatic documentation generator 120. The automatic documentation generator 120 may or may not be part of the builder 110. In general, the automatic documentation generator 120 also receives the programming code 101. While the builder 110 builds the software system 109 from the programming code 101, the automatic documentation generator 120 processes the comments embedded in the programming code 101 to generate documentation on application programming interfaces (APIs) in the programming code 101. Generally speaking, APIs are interfaces for interfacing software modules. APIs are typically called many times in programming code. As discussed above, conventional coding approach inserts comments to document an API each time the API is called in the programming code. Thus, the documentation of the API may appear many times in some conventional documentation of the programming code.

In some embodiments, the automatic documentation generator 120 extracts objects related to APIs called in the programming code 101. The automatic documentation generator 120 may use an information extraction tool, such as Javadoc, to extract the objects from comments in the programming code 101. These objects are logical entities containing information related to the APIs. For example, the objects may include names of the APIs, description of the APIs, arguments taken by the APIs, output data structures of the APIs, etc. Furthermore, an object may reference its own documentation stored in a separate file, which may be put into the final API documentation 108. Because the documentation referenced by these objects dictate the content of the API documentation 108, thus, they may be referred to as content templates 102, as shown in FIG. 1.

Besides determining the content of the API documentation 108, the automatic documentation generator 120 also determines the formatting of the content using templates. In some embodiments, each of the objects extracted is associated with a template, which defines formatting of the respective object. Thus, such a template is hereinafter referred to as a formatting template. Some exemplary formatting templates 103 are illustrated in FIG. 1. The automatic documentation generator 120 may execute macros embedded in the programming code 101 to format the objects according to their corresponding formatting templates 103. In some embodiments, multiple formatting templates may be provided for an object, each of these templates corresponding to a type of formatting, such as HTML, plaintext, etc. Users who have written the programming code 101 may have also created the formatting templates 103. Alternatively, the formatting templates 103 may be created by other users of the computing system 100. These templates 103 may also be modified from time to time to update the formatting of the API documentation 108.

In addition to the formatting templates 103, the automatic documentation generator 120 may retrieve arrangement templates 105 as well. An arrangement template is a template defining arrangement of various types of objects in documentation. After the automatic documentation generator 120 has executed macros to define formatting of individual objects using formatting templates 103, the automatic documentation generator 120 may execute other macros embedded in the comments of the programming code 101 to define arrangement of the objects using the arrangement templates 105. In other words, the arrangement templates 105 define how the formatted objects are to be put together in the documentation 108 to be generated. Finally, the automatic documentation generator 120 puts information of the APIs contained in the objects into the API documentation 108 according to the formatting and arrangement defined using the formatting templates 103 and the arrangement templates 105, respectively.

One advantage of the above approach to automatically generate documentation on APIs is the improvement in consistency of both content and formatting of the same API throughout the documentation 108 produced. Because the programming code 101 is typically created and later modified by multiple people (commonly referred to as programmers), it is difficult to ensure that each programmer puts the same content and uses the same formatting for each API called in the section of programming code that the programmer writes. By using the content templates 102, formatting templates 103, and the arrangement templates 105, the same content, formatting, and arrangement of documentation related to an API can be maintained throughout the final API documentation 108. Furthermore, the above approach also makes it easier for updating the API documentation 108 when the content, the formatting, and/or the arrangement of a certain API's documentation need to be changed because the updating can be accomplished by modifying the relevant templates among the content templates 102, the formatting templates 103 and the arrangement templates 105, instead of going through the entirety of the programming code 101 to search for each use of the API and manually update the comments inserted in the programming code 101. To further illustrate the above concept, some examples are discussed in details below.

FIG. 2A illustrates one example of an API call, which lists all systems visible to a user. The first part of the documentation is developer documentation. The @xmlrpc.* lines are the parts rendered for the user. @xmlrpc.doc is a description of the API call itself. @xmlrpc.param is the single parameter the function takes. In this case, the macro #param("string", "sessionKey") is used to signal to the renderer that this function takes a parameter of type string, named "sessionKey."

Finally, the @xmlrpc.returntype tells what the function is returning. This call is returning a list of systems, so whatever is being returned may be wrapped in #array( ) #array_end( ). If a list of strings is returned, the string may be wrapped as follows:

```
#array ( )
    string
#end_array ( )
```

In some embodiments, where another object is returned, the documentation of this object is referenced. $SystemOverviewSerializer tells it to look in the SystemOverviewSerializer class for this documentation. One embodiment of the documentation of this class is illustrated in FIG. 2B.

In the current example, #struct("name") and #struct_end( ) indicate the start and stop, respectively, of a data structure. So, during the rendering of the listSystems API call, "$SystemOverviewSerializer" will be replaced with everything in that class's $xmlrpc.doc text. In other words, the following macro:

```
#array ( )
    $SystemOverviewSerializer
#array_end ( )
``` will become:

```
#array ( )
    #struct ("system")
        #prop ("init", "id")
        #prop ("string", "name")
        #prop_desc ("dateTime.iso8601",
"last_checkin", "Last time server successfully checked in")
    #struct_end ( )
#array_end ( )
```

So far, the above example has illustrated what to render. To determine how to render, files corresponding to each supported formatting types may be used. Some examples of supported formatting types include HTML, plaintext, etc. FIG. 2C illustrates some exemplary macros for rendering in the HTML mode. In the current example, whenever #array( ) is encountered, macro 231 will replace it with "<ul><li>". Similarly, whenever #array_end( ) is encountered, macro 232 will replace it with "</li></ul>". These definitions may exist for all macros used in the programming code. Using the above approach, it can be determined what to render in the API documentation and the format in which it is rendered. Finally, additional macros and templates may be used to determine how to put the pieces together to form the API documentation. One example is discussed in details below to illustrate this concept.

In one example, a custom program working with an information extraction tool, such as a doclet that works with Javadoc, takes in all of the raw information about the classes and creates custom objects to more easily generate the final documentation with. For instance, $handler and $call are the handy objects in this example. As mentioned above, a second set of type-specific files, also referred to as arrangement templates, define how to put it all together. FIG. 2D illustrates one exemplary template from an embodiment of an HTML type file. The template in FIG. 2D may render a list of API calls in HTML, showing only the names of the APIs.

In summary, there are three levels of templates in the examples discussed above, namely, 1) comments in the code which detail what is to be displayed; 2) templates to translate macros from the code into type-specific formatting, which show how to display individual pieces; and 3) templates that details how to arrange the objects on a particular page, or across multiple pages, that is specific to a type (e.g., HTML, plaintext, etc.).

Figure 3:
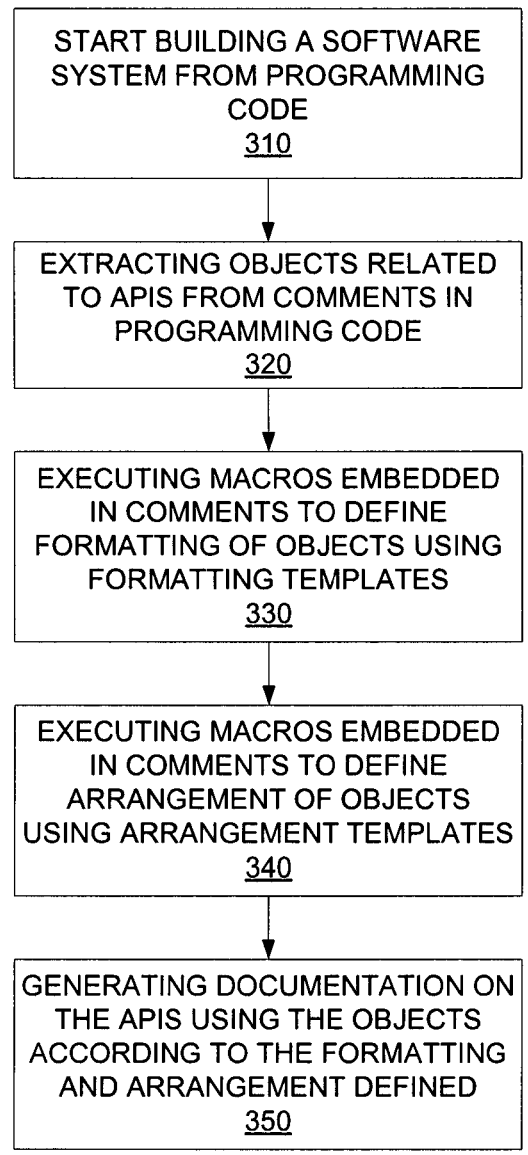
FIG. 3 illustrates a flow diagram of one embodiment of a method to automatically generate documentation on APIs.

FIG. 3 illustrates a flow diagram of one embodiment of a method to automatically generate API documentations. The method may be performed by processing logic that may comprise hardware (e.g., circuitry, dedicated logic, programmable logic, microcode, etc.), software (such as instructions run on a processing device), firmware, or a combination thereof. For instance, the computing system 400 illustrated in FIG. 4 may perform at least part of the method in some embodiments.

Initially, processing logic starts building a software system from programming code (processing block 310). In some embodiments, the software system comprises machine-readable binary code executable by computing machines to perform one or more tasks or functions, whereas the programming code generally includes human-readable programming instructions and comments. To build the software system, processing logic may convert the human-readable programming instructions into machine-readable binary code. In some embodiments, the programming code includes many APIs called multiple times. Wherever an API is called within the programming code, comments may be inserted into the programming code (typically by the programmer who writes the programming code) to document the API.

In some embodiments, processing logic extracts objects related to APIs from the comments in the programming code (processing block 320). An object related to the API generally refers to a logical entity containing certain information on the API, such as name of the API, description of the API, arguments taken by the API, return structure of the API, etc. To extract an object related to an API from the comments in the programming code, processing logic may go through the programming code to identify information related to the API and then create a logical entity as the object to contain such information. The object may further reference a separate piece of documentation of the API. This separate piece of documentation may thus, be viewed as a content template associated with this API, where the content template can be updated whenever the content of the documentation of this API has to be changed. Processing logic may use an information extraction tool, such as Javadoc, to extract the objects from the programming code. The objects can be easily manipulated by macros and/or custom programs (such as doclets) to generate documentation on the APIs.

In addition to extracting objects from the comments in the programming code, processing logic executes macros in the comments to define formatting of the objects using one or more formatting templates (processing block 330). Each object may be associated with a particular formatting template. Processing logic may retrieve a corresponding template for each object extracted. Based on details specified in the corresponding template, processing logic may define the formatting of the object.

Likewise, processing logic executes additional macros in the comments to define arrangement of the objects using one or more arrangement templates (processing block 340). Details of some embodiments of formatting templates and arrangement templates have been discussed above. Finally, processing logic generates documentation of the APIs using the objects extracted according to the formatting and arrangement defined (processing block 350).

FIG. 4 illustrates a diagrammatic representation of a machine in the exemplary form of a computing system 400 within which a set of instructions, for causing the machine to perform any one or more of the methodologies discussed herein, may be executed. In alternate embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computing system 400 includes a processing device 402, a main memory 404 (e.g., read-only memory (ROM), flash memory, dynamic random access memory (DRAM) such as synchronous DRAM (SDRAM), a static memory 406 (e.g., flash memory, static random access memory (SRAM), etc.), and a data storage device 418, which communicate with each other via a bus 432.

Processing device 402 represents one or more general-purpose processing devices such as a microprocessing device, a central processing unit, or the like. More particularly, the processing device may be complex instruction set computing (CISC) microprocessing device, reduced instruction set computing (RISC) microprocessing device, very long instruction word (VLIW) microprocessing device, or processing device implementing other instruction sets, or processing devices implementing a combination of instruction sets. Processing device 402 may also be one or more special-purpose processing devices such as an application specific integrated circuit (ASIC), a field programmable gate array (FPGA), a digital signal processing device (DSP), network processing device, or the like. The processing device 402 is configured to execute the automatic documentation generator 426 for performing the operations and steps discussed herein.

The computing system 400 may further include a network interface device 408. The computing system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a computer-accessible storage medium 430 (also known as a computer-readable storage medium) on which is stored one or more sets of instructions (e.g., automatic documentation generator 422) embodying any one or more of the methodologies or functions described herein. The automatic documentation generator 422 may also reside, completely or at least partially, within the main memory 404 and/or within the processing device 402 during execution thereof by the computing system 400, the main memory 404 and the processing device 402 also constituting computer-accessible storage media. The automatic documentation generator 422 may further be transmitted or received over a network 420 via the network interface device 408.

While the computer-readable storage medium 430 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical and magnetic media, etc.

The automatic documentation generator 428, components and other features described herein (for example, in relation to FIG. 1) can be implemented as discrete hardware components or integrated into the functionalities of hardware components, such as ASICS, FPGAs, DSPs, or similar devices. In addition, the automatic documentation generator 428 can be implemented as firmware or functional circuitries within hardware devices. Further, the automatic documentation generator 428 can be implemented in any combination of hardware devices and software components.

Thus, some embodiments of a system and a method to automatically generate documentation on APIs have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   building, by a processing device, a software system from programming code comprising application programming interfaces (APIs);
   extracting, by the processing device, objects related to the APIs;
   executing, by the processing device, macros embedded in comments using templates associated with the objects extracted, wherein the comments are embedded in the programming code; and
   generating, by the processing device, documentation on the APIs using the objects extracted and the executed macros while building the software system.

2. The method of claim 1, wherein the templates comprise a first set and a second set of templates, wherein the macros comprise a first set and a second set of macros, and generating documentation on the APIs comprises:
   executing, by the processing device, the first set of one or more macros embedded in comments to define formatting of individual ones of the objects using the first set of templates;
   executing, by the processing device, the second set of one or more macros embedded in the comments to define arrangement of the objects using the second set of templates; and using the objects to generate the documentation on the APIs according to the formatting and arrangement defined.

3. The method of claim 1, further comprising:
displaying, by a display device, the documentation in a predetermined format according to the templates.

4. The method of claim 1, wherein the documentation is in Hypertext Transfer Markup Language (HTML).

5. The method of claim 1, wherein the objects include one or more of names of the APIs, arguments of the APIs, return structures of the APIs, and descriptions of the APIs.

6. The method of claim 1, wherein one of the objects includes a reference to a content template.

7. The method of claim 1, further comprising:
modifying, by the processing device, one or more of the templates in order to modify formatting of the documentation.

8. The method of claim 1, further comprising:
modifying, by the processing device, one or more of the templates in order to modify arrangement of the objects in the documentation.

9. A system comprising:
a memory;
a processing device coupled to the memory, wherein the processing device is configured to:
build a software system from programming code comprising application programming interfaces (APIs), extract objects related to the APIs, execute macros embedded in comments using templates associated with the objects extracted, wherein the comments are embedded in the programming code and generate documentation on the APIs using the objects extracted and the executed macros while building the software system.

10. The system of claim 9, further comprising:
a storage device to store the templates, wherein the templates comprise a first set and a second set of templates, wherein the macros comprise a first set and a second set of macros and the processing device is operable to execute the first set of one or more macros embedded in comments to define formatting of individual ones of the objects using the first set of templates, to execute the second set of one or more macros embedded in the comments to define arrangement of the objects using the second set of templates, and to use the objects to generate the documentation on the APIs according to the formatting and arrangement defined.

11. The system of claim 9, further comprising:
a display device coupled to the processing device, to display the documentation in a predetermined format according to the templates.

12. The system of claim 9, wherein the documentation is in Hypertext Transfer Markup Language (HTML).

13. The system of claim 9, wherein the objects include one or more of names of the APIs, arguments of the APIs, return structures of the APIs, and descriptions of the APIs.

14. The system of claim 9, wherein one of the objects includes a reference to a content template.

15. The system of claim 9, wherein the processing device is operable to modify one or more of the templates in order to modify formatting of the documentation.

16. The system of claim 9, wherein the processing device is operable to modify one or more of the templates in order to modify arrangement of the objects in the documentation.

17. A non-transitory computer-readable storage medium embodying instructions that, when executed by a processing device, will cause the processing device to perform a method comprising:
building, by a processing device, a software system from programming code comprising application programming interfaces (APIs);
extracting, by the processing device, objects related to the APIs;
executing, by the processing device, macros embedded in comments using templates associated with the objects extracted, wherein the comments are embedded in the programming code; and
generating, by the processing device, documentation on the APIs using the objects extracted and the executed macros while building the software system.

18. The non-transitory computer-readable storage medium of claim 17, wherein the templates comprise a first set and a second set of templates, wherein the macros comprise a first set and a second set of macros, and generating documentation on the APIs comprises:
executing, by the processing device, the first set of one or more macros embedded in comments to define formatting of individual ones of the objects using the first set of templates;
executing, by the processing device, the second set of one or more macros embedded in the comments to define arrangement of the objects using the second set of templates; and
using the objects to generate the documentation on the APIs according to the formatting and arrangement defined.

19. The non-transitory computer-readable storage medium of claim 17, wherein the method further comprises:
displaying on a display device the documentation in a predetermined format according to the templates.

20. The non-transitory computer-readable storage medium of claim 17, wherein the documentation is in Hypertext Transfer Markup Language (HTML).

21. The non-transitory computer-readable storage medium of claim 17, wherein the objects include one or more of names of the APIs, arguments of the APIs, return structures of the APIs, and descriptions of the APIs.

22. The non-transitory computer-readable storage medium of claim 17, wherein one of the objects includes a reference to a content template.

23. The non-transitory computer-readable storage medium of claim 17, wherein the method further comprises:
modifying one or more of the templates in order to modify formatting of the documentation.

24. The non-transitory computer-readable storage medium of claim 17, wherein the method further comprises:
modifying one or more of the templates in order to modify arrangement of the objects in the documentation.

* * * * *